Patented Feb. 23, 1937

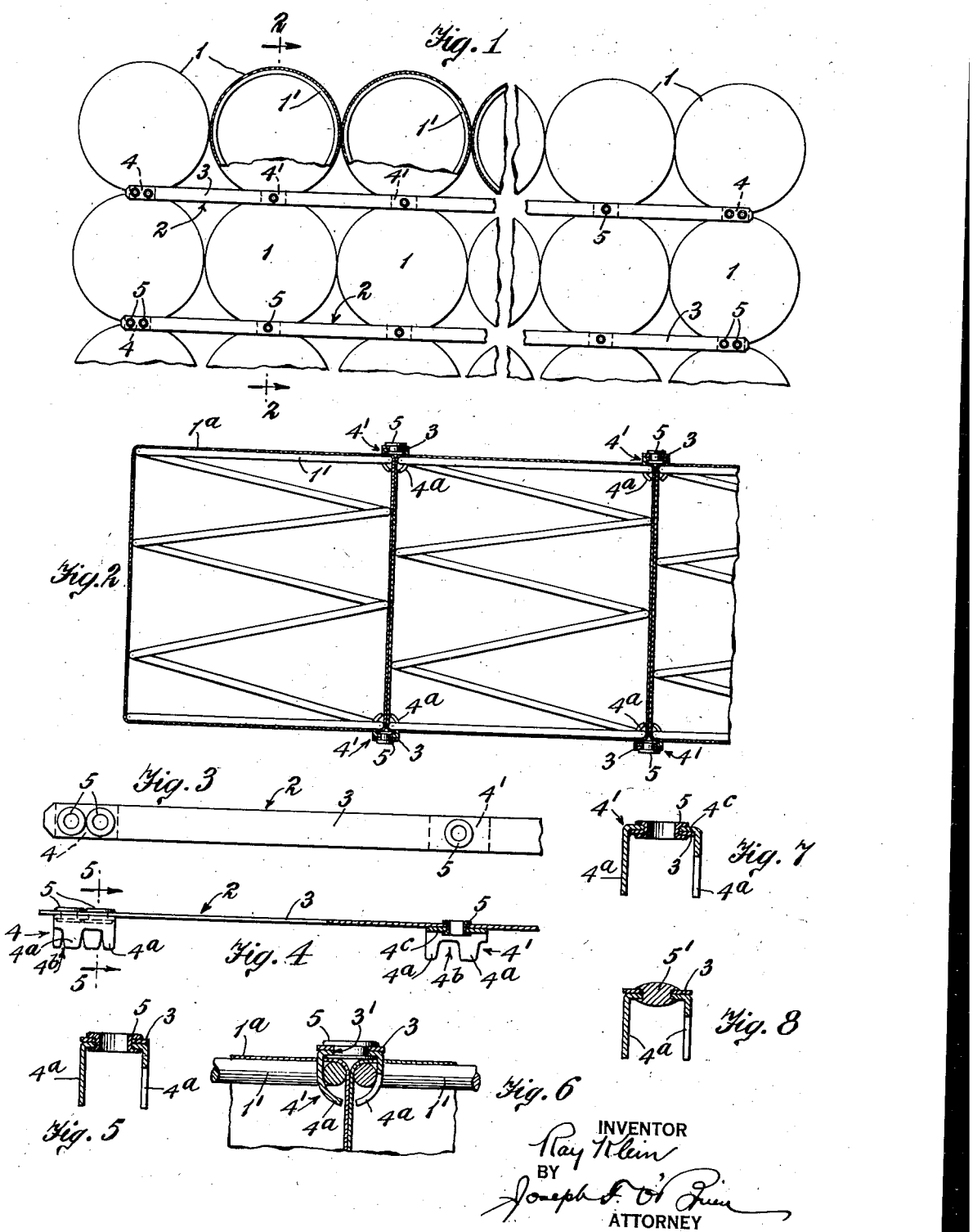

2,071,540

UNITED STATES PATENT OFFICE 2,071,540

SPRING CUSHION

Ray Klein, Brooklyn, N. Y.

Application August 4, 1934, Serial No. 738,442

2 Claims. (Cl. 5—267)

This invention relates to improvements in spring cushions.

One of the objects of my invention is to utilize, in a spring cushion, an interconnecting element, including a highly-resilient bridging strip which will be capable of connection to and ready flexing with the spring to which it is connected.

Another object of this invention is to utilize, in a spring cushion, an interconnecting element for the springs, composed of a spring-bridging strip of highly-resilient or highly-elastic spring-steel adapted to be readily flexed under pressure with the spring or springs to which it is connected, in combination with a fastening member composed of non-resilient readily-deformable metal adapted to take a permanent bend under manual pressure, and means preferably comprising a rivet, in the form of an eyelet, for firmly connecting said highly-resilient strip and fastening member together.

Still another object of my invention is to provide an element of the type under consideration which is cheap to manufacture and which may be readily and quickly applied in the practical work of fastening the spring members of a cushion together.

Still another object of my invention is to provide a plurality of fastening members, each securely and permanently fastened intermediate its ends to said spring-bridging strip and spaced from each other to enable the interfastening of a series of pairs of springs, each of said fastening members having its opposite ends readily bendable into fastening engagement with a pair of springs by the use of an ordinary pair of pincers and to be pinched together over the adjacent top spirals of a pair of springs, so that a workman may quickly and readily interconnect and fasten a series of pairs of adjacent spring members.

With these and other objects in view the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawing, in which:—

Fig. 1 is a plan view, partially broken away, of a spring cushion embodying my invention;

Fig. 2 is an enlarged section on the line 2—2 of Fig. 1 looking in the direction of the arrows;

Fig. 3 is a view in plan of the spring interconnecting element broken away at one end;

Fig. 4 is a side elevation of the interconnecting element shown in Fig. 3, a portion of one end thereof being cut away and shown in section;

Fig. 5 is a section on the line 5—5 of Fig. 4 looking in the direction of the arrows;

Fig. 6 is an enlarged sectional view showing the connection of the fastening member to a pair of adjacent spring members;

Fig. 7 is a section similar to Fig. 5 showing a slightly modified form of my invention, and Fig. 8 is a similar section showing another slightly modified form of my invention.

Referring now to this drawing, and particularly to Figs. 1 to 6, which illustrate a preferred form of my invention, I indicates a series of wire spring members of conventional type each enclosed in a bag 1ª. These conventional springs are suitably positioned in adjacency with each other, and in accordance with my invention an interconnecting element 2 comprising a thin spring-bridging strip 3 of highly-resilient and flexible metal having suitably spaced along its length a series of fastening members 4, 4' composed of readily-deformable metal, the latter having sharpened teeth 4ª arranged at opposite sides of interdental spaces 4ᵇ and adapted to be pressed downwardly through the bag 1ª and into engagement with the two abutting terminal spirals 1' of the spring members 1, said spirals thus being positioned within a single fastening channel between the said teeth 4ª. The fastening member 4 is permanently and securely fastened intermediate its ends to the strip 3, and in accordance with my invention, the fastening member 4 is formed into a channel formation, the web or bottom 4ᶜ of the channel is provided with one or more perforations, the strip 3 is likewise provided with similar perforations 3', and a rivet preferably comprising an eyelet 5 is passed through and riveted to the two parts. The fastening member and the strip are thus securely and permanently riveted together.

Upon pressing the interconnecting element with its toothed fastening members through the bag on opposite sides of the terminal spirals 1', it is only necessary to bend the teeth 4ª of the fastening member toward each other by use of a pair of pliers or like instrument, in order to secure a thorough and permanent fastening of adjacent rungs or spirals of the spring members together.

The initial fastening of the fastening members to the flexible steel strip at spaced intervals enables the speedy connection and secure fastening of the strip to a series of pairs of springs and it will be apparent by the use of my invention, a spring cushion may be formed with great rapidity.

In Fig. 7, I have shown a slightly modified construction in which the spring-bridging strip 3 passes beneath the web portion 4c of the channel-shaped fastening member 4 instead of above the same.

In Fig. 8, the construction is in all respects similar to that shown and described in relation to Figs. 1 to 6 except that a solid rivet 5' is employed instead of the eyelet 5 of said figure.

It will also be seen that in a spring cushion made in accordance with my invention herein-will follow and flex with the spring members to willl follow and flex with the spring members to which it is applied upon the application of pressure thereto and will resume its original condition with the spring and without any appreciable deformation and also, at all times during such flexing, the fastening members which are made of readily-deformable material will maintain a firm and secure connection with the springs, and a firm interconnection of the springs under consideration will upon the application of pressure to one portion of the spring cushion, cause such pressure to be transmitted and distributed to other parts of the spring cushion.

It will be seen furthermore that the use of the highly-resilient spring-steel strip in connection with a secure fastening of the same to the spring member provides, intermediate the individual springs, a plurality of spring interconnecting elements which make the spring so interconnected as to form a unitary cushion structure. It will be seen, furthermore, that when the spring members are interconnected in the way hereinabove described a spring cushion will be produced that will be highly durable and will not become loose or disengaged under the most strenuous usage.

In Fig. 1 of this drawing my interconnecting elements are in order to avoid multiplicity of parts, disposed in one direction only between adjacent series of springs. Obviously similar interconnecting elements may also be disposed along the outer edges of the springs and, if desired may also be disposed transversely of the interconnecting elements shown, so as to connect portions of the springs that abut at positions transversely of the connections shown, but in the conventional spring cushion, these additional interconnecting elements are unnecessary.

Having described my invention, I claim:

1. A spring cushion embodying, in combination, a series of spring members having abutting spiral wires and an interconnecting element therefor composed of a strip of resilient spring metal and fastening members securely connected to said spring metal strip at spaced positions along the length thereof, said members being of channel formation and each having walls of deformable metal bent toward each other over and into engagement with said abutting spiral members, said fastening members being disposed between parallel planes registering with the edges of said strip and the abutting spiral wires of a plurality of spring members being received and connected by a single fastening member.

2. A spring cushion embodying, in combination, a series of spring members having abutting spiral wires and an interconnecting element therefor composed of a strip of resilient spring metal and spaced fastening members composed of deformable metal, U-shaped in cross section, having webs abutting against one face of said strip and provided with flanges disposed vertically in open position of the fastening member; rivets connecting the webs of said U-shaped fastening members to said resilient metal strip, each of said U-shaped fastening members forming a receiving channel having said flanges substantially in vertical alignment with the side edges of the strip and being provided with teeth bent toward each other over the connecting rivet and engaging said abutting spiral wires over said rivet and the abutting spiral wires of a plurality of spring members being received and connected by a single fastening member.

RAY KLEIN.

CERTIFICATE OF CORRECTION.

Patent No. 2,071,540.                                                                February 23, 193

RAY KLEIN.

It is hereby certified that error appears in the printed specification of the above numbered patent requiring correction as follows: Page 2, first column, lines 14 and 15, strike out "will follow and flex with the spring members to will1" and insert instead the syllable and words above specified, the flexible, spring-steel strip will; and that the said Letters Patent should be read with this correction therein that the same may conform to the record of the case in the Patent Office.

Signed and sealed this 23rd day of March, A. D. 1937.

(Seal)
Henry Van Arsdale
Acting Commisioner of Patents.